(12) United States Patent
Taylor

(10) Patent No.: US 10,435,184 B2
(45) Date of Patent: Oct. 8, 2019

(54) METHOD OF SPACE TRAVEL USING A HIGH ACCELERATION THRUST VEHICLE IN COMBINATION WITH A PLURALITY OF LOW ACCELERATION THRUST VEHICLES

(71) Applicant: Darrin Taylor, Loma Linda, CA (US)

(72) Inventor: Darrin Taylor, Loma Linda, CA (US)

(*) Notice: Subject to any disclaimer, the term of this patent is extended or adjusted under 35 U.S.C. 154(b) by 418 days.

(21) Appl. No.: 15/359,285

(22) Filed: Nov. 22, 2016

(65) Prior Publication Data
US 2017/0320601 A1   Nov. 9, 2017

Related U.S. Application Data

(60) Provisional application No. 62/332,556, filed on May 6, 2016.

(51) Int. Cl.
*B64G 1/64* (2006.01)
*B64G 1/40* (2006.01)

(52) U.S. Cl.
CPC ............ *B64G 1/645* (2013.01); *B64G 1/405* (2013.01); *B64G 1/407* (2013.01); *B64G 1/409* (2013.01)

(58) Field of Classification Search
CPC ........ B64G 1/645; B64G 1/405; B64G 1/407; B64G 1/409
See application file for complete search history.

(56) References Cited

U.S. PATENT DOCUMENTS

| | | | |
|---|---|---|---|
| 4,553,037 A | 11/1985 | Veazey | |
| 4,614,319 A | 9/1986 | Drexler | |
| 5,312,073 A | 5/1994 | Flament et al. | |
| 5,626,315 A | 5/1997 | Flament et al. | |
| 5,697,582 A | 12/1997 | Surauer et al. | |
| 6,194,790 B1 | 2/2001 | Griffin et al. | |
| 6,565,044 B1 * | 5/2003 | Johnson | B64G 1/32 244/171.5 |
| 6,698,693 B2 | 3/2004 | Davidson | |
| 7,913,953 B2 | 3/2011 | Ellinghaus | |
| 8,356,774 B1 | 1/2013 | Banik et al. | |
| 2007/0205331 A1 * | 9/2007 | Janhunen | B64G 1/222 244/171.5 |
| 2008/0217482 A1 * | 9/2008 | Ellinghaus | B64G 1/222 244/171.1 |

* cited by examiner

*Primary Examiner* — Valentina Xavier

(57) ABSTRACT

A method of space travel using a high acceleration thrust vehicle in combination with a plurality of low acceleration thrust vehicles. A primary spacecraft has a kinetic launcher that is utilized to discharge a plurality of subsidiary spacecraft in order to navigate the primary spacecraft along a flight path. Each of the plurality of subsidiary spacecraft has a propulsion system, allowing each of the plurality of subsidiary spacecraft to navigate to a refueling point. The refueling point for each of the plurality of subsidiary spacecraft may be a central location or a unique position along a subsequent flight path. Each of the plurality of subsequent spacecraft is then reloaded onto the primary spacecraft or loaded onto a subsequent spacecraft for another voyage. The kinetic launcher can be repositioned in order to control the direction of the acceleration experienced by the primary spacecraft.

12 Claims, 15 Drawing Sheets

US 10,435,184 B2

METHOD OF SPACE TRAVEL USING A HIGH ACCELERATION THRUST VEHICLE IN COMBINATION WITH A PLURALITY OF LOW ACCELERATION THRUST VEHICLES

The current application claims a priority to the U.S. Provisional Patent application Ser. No. 62/332,556 filed on May 6, 2016.

FIELD OF THE INVENTION

The present invention relates generally to the field of acceleration methods. More specifically, the present invention is a method of high acceleration thrust in outer space using a two stage process. The method can be configured to transit faster than rocket fuel and not consume any reaction mass unlike rocket fuel or even ion propulsion.

BACKGROUND OF THE INVENTION

Specific impulse increases with the velocity of reaction mass "fuel" due to the conservation of momentum, while the acceleration rate is limited by available energy. Because kinetic energy is $\frac{1}{2}*mass*velocity^2$, the available acceleration is inversely proportional to the velocity of the reaction mass. So traditionally, spacecraft propulsion can be optimized for acceleration (e.g. rocket fuel using lower velocity exhaust but providing higher acceleration) or specific impulse (e.g. ion propulsion using higher velocity exhaust but limited by available energy to lower acceleration). Thus, it is difficult to achieve good results for both acceleration and specific impulse. Furthermore, when using non-reusable reaction mass such as rocket fuel, much energy is wasted on accelerating the remaining reaction mass that will only be ejected later. Launching any object into low Earth orbit (LEO) has very large energy and dollar costs, thus it is optimal to reduce the weight need to be lifted or minimize the number of times fuel must be launched into space.

Therefore it is an object of the present invention to provide a method that allows for the high acceleration of a primary spacecraft through the low velocity ejecting of a plurality of subsidiary spacecraft. Each of the plurality of subsidiary spacecraft has a propulsion system, allowing the plurality of subsidiary spacecraft to be directed to a refueling point and reloaded onto the primary spacecraft to be reused. Because each of the plurality of subsidiary spacecraft is recycled, the average momentum transferred per kilogram of "fuel" lifted to LEO is actually higher than that of the best rocket fuel. Furthermore, eliminating the need to lift new, Earth sourced fuel into LEO provides enormous economic savings. The potential elimination of non-reusable reaction mass provides a large disruptive performance gain relative to current state of the art approaches, especially as the benefits of the present invention scale over time. Using the present invention, round trip shuttles between LEO and Martian low orbit could be achieved without any new fuel from Earth, allowing the economic case for Mars colonization to include the ability to export to Earth.

DETAIL DESCRIPTIONS OF THE INVENTION

Figure 1:
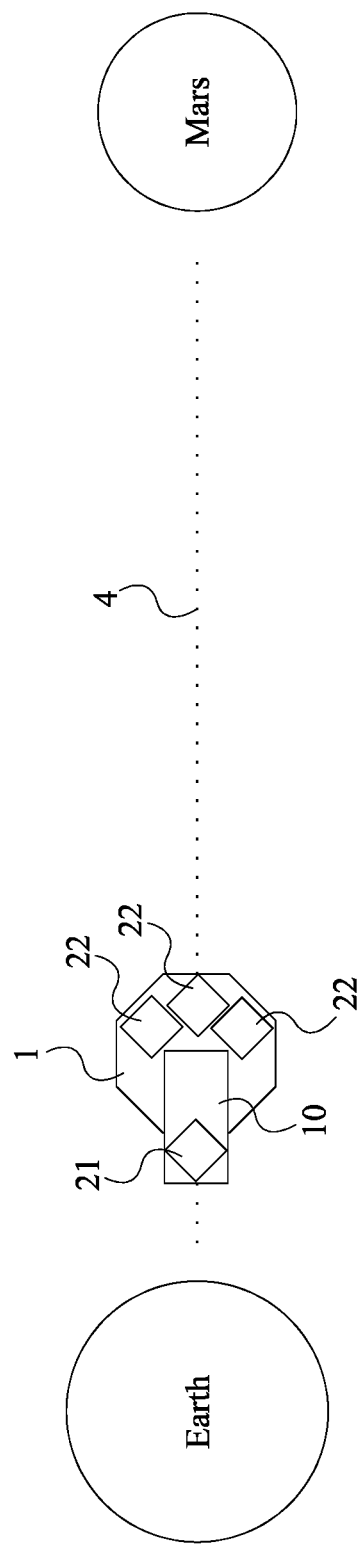
FIG. 1 is a diagram depicting a first exemplary embodiment, wherein each of the plurality of subsidiary spacecraft is loaded onto the primary spacecraft together.

All illustrations of the drawings are for the purpose of describing selected versions of the present invention and are not intended to limit the scope of the present invention.

The present invention is a method of space travel using a high acceleration thrust vehicle in combination with a plurality of low acceleration thrust vehicles. The method has two acceleration stages: a first acceleration stage harnessing kinetic thrust with a low specific impulse and high acceleration; and a second acceleration stage harnessing high specific impulse thrust with low acceleration. The first acceleration stage is carried out to navigate a primary spacecraft 1, while the second acceleration stage is carried out to navigate a plurality of subsidiary spacecraft 2.

The plurality of subsidiary spacecraft 2 serve as the reaction mass that is used to propel the primary spacecraft 1. The plurality of subsidiary spacecraft 2 provide a reusable means of fueling the primary spacecraft 1, and generate a high acceleration, low specific impulse thrust that propels the primary spacecraft 1. Meanwhile, each of the plurality of subsidiary spacecraft 2 comprises a propulsion system 20 that has little or no reaction mass. The propulsion system 20 of each of the plurality of subsidiary spacecraft 2 produces a low acceleration, high specific impulse thrust that propels each of the plurality of subsidiary spacecraft 2.

The propulsion system 20 for each of the plurality of subsidiary spacecraft 2 may be one of a solar sail, an electronics sail, a magnetic sail, an ion propulsion system 20, a magnetic thrust device, or any other device capable of producing high specific impulse thrust or thrust that does not require carrying reaction mass on board. Ideally, the propulsion system 20 of each of the plurality of subsidiary spacecraft 2 uses a non-local reaction mass. While the interaction between the plurality of subsidiary spacecraft 2 and the Sun or planets (via photons, charged particles, electric fields, gravitational fields, magnetic fields, etc.) is limited to small forces, and thus low acceleration, there is no need to refuel the plurality of subsidiary spacecraft 2.

The primary spacecraft 1 comprises a kinetic launcher 10 that is utilized to discharge the plurality of subsidiary spacecraft 2 from the primary spacecraft 1. The kinetic launcher 10 provides a means of kinetically launching the plurality of subsidiary spacecraft 2, without damaging the plurality of subsidiary spacecraft 2. Thus, the structural stability of the plurality of subsidiary spacecraft 2 provides the only limitation on the acceleration with which each of the plurality of subsidiary spacecraft 2 is launched.

The kinetic launcher 10 may be one of a coil-gun, a railgun, a magnetic levitation device, a linear motor, a catapult, a circular acceleration device, or any other device capable of launching the plurality of subsidiary spacecraft 2 at sufficient speed. In the preferred embodiment of the present invention, each of the plurality of subsidiary spacecraft 2 is loaded into and launched from the kinetic launcher 10 one at a time. However, in other embodiments, two or more of the plurality of subsidiary spacecraft 2 may be loaded into or launched from the kinetic launcher 10 at a time.

The present invention is hereinafter described in relation to travel between Earth and Mars, however, it is to be known that the present invention can be employed for travel between any number of astral destinations. The primary spacecraft 1 and the plurality of subsidiary spacecraft 2 are first launched into low Earth orbit (LEO). The plurality of subsidiary spacecraft 2 may be loaded onto the primary spacecraft 1 prior to launch, wherein the primary spacecraft 1 and the plurality of subsidiary spacecraft 2 are launched into LEO simultaneously. Or, the primary spacecraft 1 and the plurality of subsidiary spacecraft 2 can be launched separate from each other.

Figure 9:
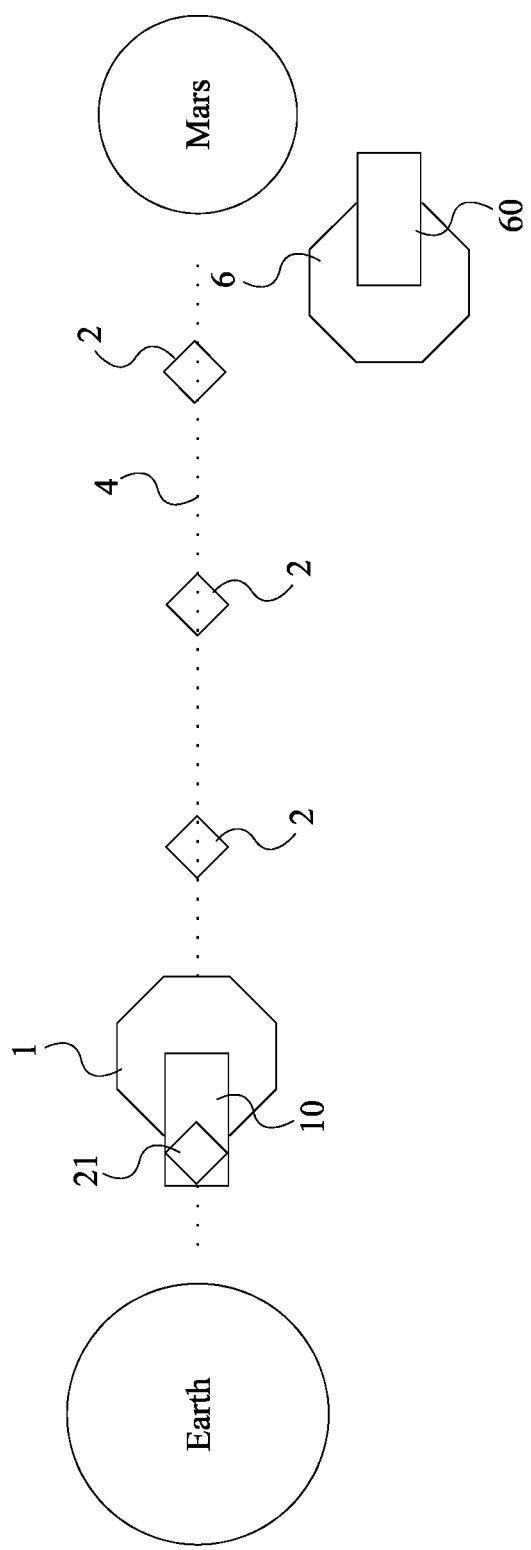
FIG. 9 is a diagram depicting a third exemplary embodiment, wherein the plurality of subsidiary spacecraft is prepositioned along the flight path, and wherein a subsequent spacecraft is in position at the end of the flight path.

If the plurality of subsidiary spacecraft 2 is launched separate from the primary spacecraft 1, then each of the plurality of spacecraft must be loaded onto the primary spacecraft 1. In one embodiment, each of the plurality of subsidiary spacecraft 2 is loaded onto the primary spacecraft 1 in LEO, as depicted in FIG. 1. In an alternative embodiment, each of the plurality of subsidiary spacecraft 2 is positioned along a flight path 4 of the primary spacecraft 1 as depicted in FIG. 9, wherein each of the plurality of subsidiary spacecraft 2 is loaded onto the primary spacecraft 1 sequentially, as the primary spacecraft 1 navigates along the flight path 4. One or more of the plurality of subsidiary spacecraft 2 may be loaded initially in order for the primary spacecraft 1 to have enough fuel to exit LEO.

Figure 13:
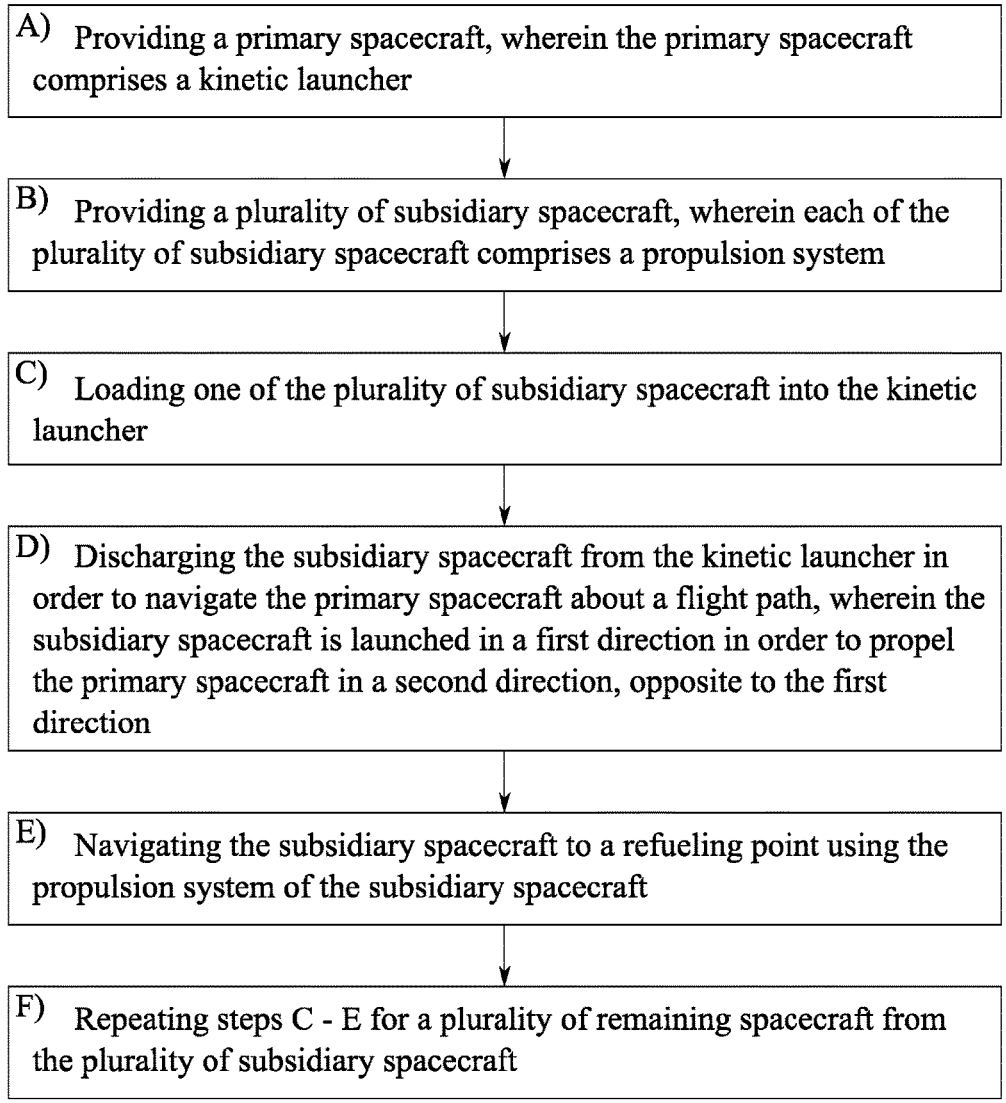
FIG. 13 is a flowchart reciting the steps for space travel using a high acceleration thrust vehicle in combination with a plurality of low acceleration thrust vehicles.

In reference to FIG. 13, once loaded onto the primary spacecraft 1, one of the plurality of subsidiary spacecraft 2 is loaded into the kinetic launcher 10 (step C). The subsidiary spacecraft 21 is then discharged from the kinetic launcher 10 in order to navigate the primary spacecraft 1 about the flight path 4 (step D). More specifically, the subsidiary spacecraft 21 is launched in a first direction in order to propel the primary spacecraft 1 in a second direction, opposite the to the first direction. The discharge of the subsidiary spacecraft 21 from the kinetic launcher 10 produces a high acceleration that drives the primary spacecraft 1. The direction of the kinetic launcher 10 can be adjusted in order to change the direction of the high acceleration experienced by the primary spacecraft 1.

Once launched from the primary spacecraft 1, the subsidiary spacecraft 21 is directed to a refueling point. The refueling point is a location where the subsidiary is once again loaded onto the primary spacecraft 1 or is loaded onto a subsequent spacecraft 6; the subsequent spacecraft 6 having a subsequent kinetic launcher 60. Using the propulsion system 20 of the subsidiary spacecraft 21 to navigate, the subsidiary spacecraft 21 travels to the refueling point (step E) and awaits the arrival of the primary spacecraft 1 or the subsequent spacecraft 6.

Steps C-E are then repeated for each of a plurality of remaining spacecraft 22 from the plurality of subsidiary spacecraft 2 in order to navigate the primary spacecraft 1 to Mars. When approaching low Mars orbit (LMO), the kinetic launcher 10 may be repositioned, such that each of the remaining spacecraft is discharged towards Mars. In this way, the primary spacecraft 1 experiences high acceleration in an opposite direction, causing an acceleration of the primary spacecraft 1 in the direction necessary to allow the primary spacecraft 1 to settle into LMO. The primary spacecraft 1 can then rest in LMO until each of the plurality of subsidiary spacecraft 2 is reorganized for reloading.

In one embodiment of the present invention, the refueling point for each of the plurality of subsidiary spacecraft 2 is the same, wherein each of the plurality of subsidiary spacecraft 2 is reloaded onto the primary spacecraft 1 or loaded onto the subsequent spacecraft 6 at the same time. In another embodiment of the present invention, the refueling point for each of the plurality of subsidiary space craft is plotted along a subsequent flight path 5 for either the primary spacecraft 1 or the subsequent spacecraft 6. The subsequent flight path 5 may be a return trip from Mars, a trip to another planetary body, etc.

Figure 2:
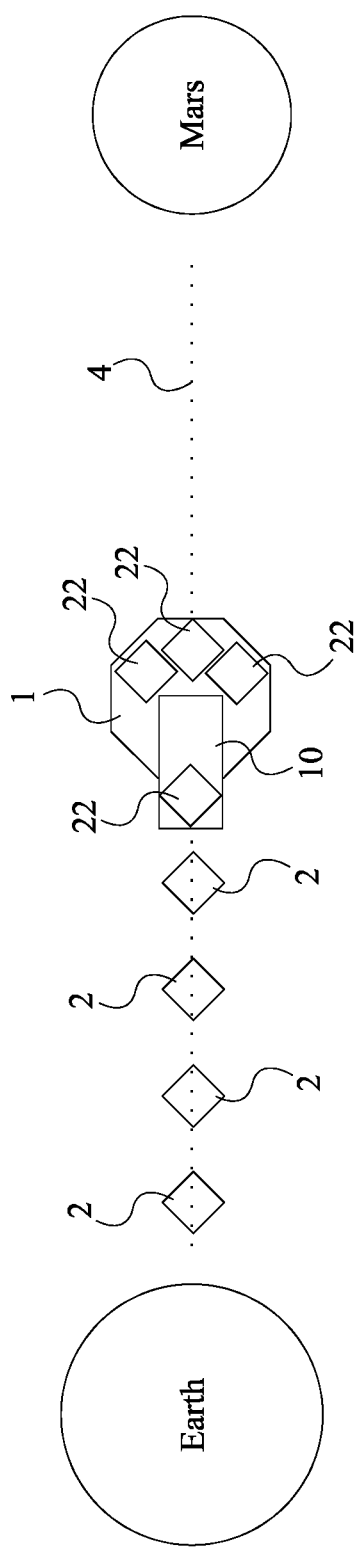
FIG. 2 is a diagram thereof, depicting the navigation of the primary spacecraft along the flight path by discharging each of the plurality of subsidiary spacecraft from the kinetic launcher.
Figure 3:
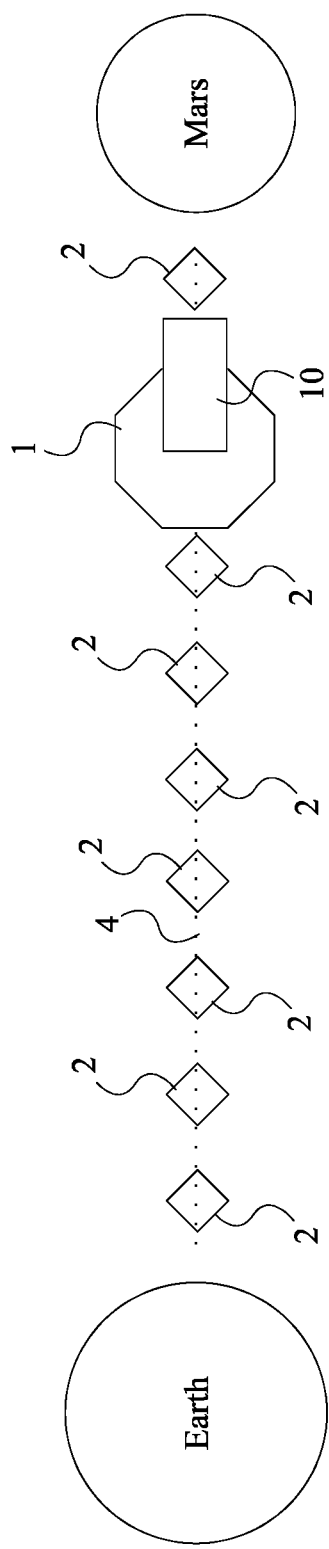
FIG. 3 is a diagram thereof, depicting the kinetic launcher being repositioned to direct the plurality of subsidiary spacecraft such that the primary spacecraft is accelerated in the direction necessary to achieve low Mars orbit (LMO).

In a first exemplary embodiment, the primary spacecraft 1 travels from Earth to Mars. In reference to FIG. 1, each of the plurality of subsidiary spacecraft 2 is loaded onto the primary spacecraft 1 in LEO. Each of the plurality of subsidiary spacecraft 2 is discharged from the kinetic launcher 10 one at a time in order to propel the primary spacecraft 2 along the flight path 4, as depicted in FIG. 2. Upon reaching LMO, the kinetic launcher 10 is redirected, as depicted in FIG. 3, in order to accelerate the primary spacecraft 1 in the correct direction to settle into LMO.

Figure 4:
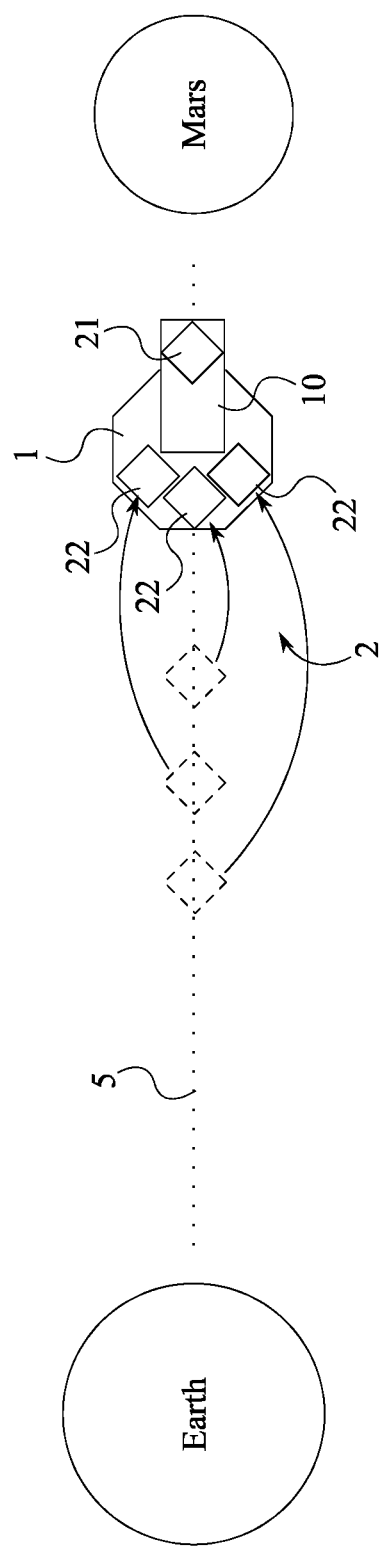
FIG. 4 is a diagram thereof, depicting the navigation of the plurality of subsidiary spacecraft back to the primary spacecraft.

In reference to FIG. 4, after being discharged from the kinetic launcher 10, each of the plurality of subsidiary spacecraft 2 navigates to Mars as well. Each of the plurality of subsidiary spacecraft 2 is then loaded onto the primary spacecraft 1 and reused by the primary spacecraft 1 to travel from Mars to Earth. The plurality of subsidiary spacecraft 2 navigate back to Earth and the cycle may continue for subsequent voyages.

Figure 5:
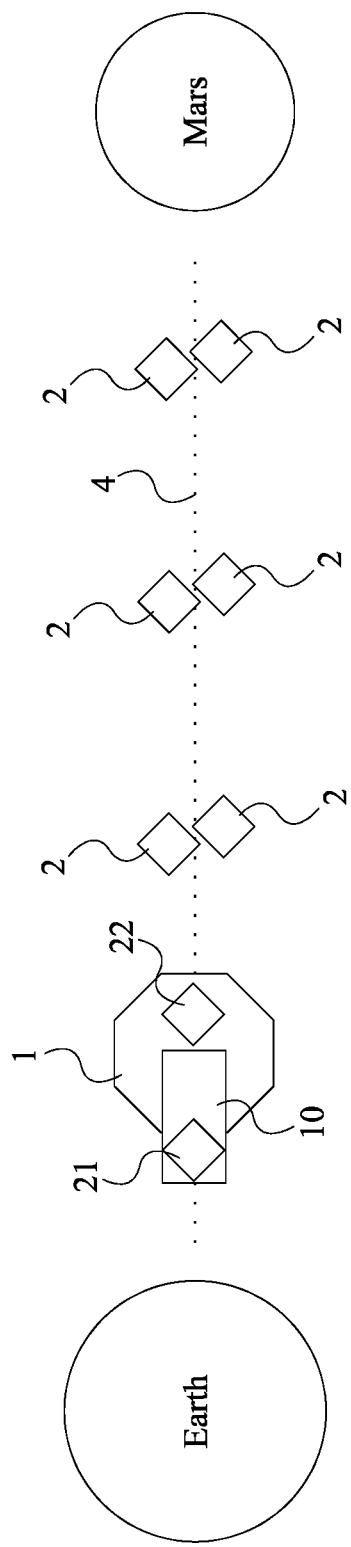
FIG. 5 is a diagram depicting a second exemplary embodiment, wherein the plurality of subsidiary spacecraft is prepositioned along the flight path.
Figure 6:
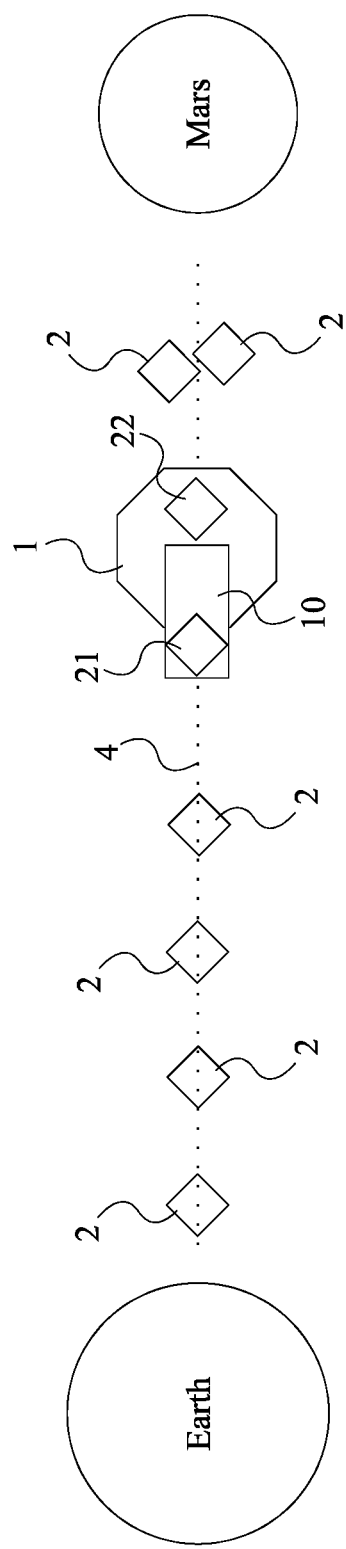
FIG. 6 is a diagram thereof, depicting the navigation of the primary spacecraft along the flight path by sequentially loading and discharging sets of the plurality of subsidiary spacecraft.
Figure 7:
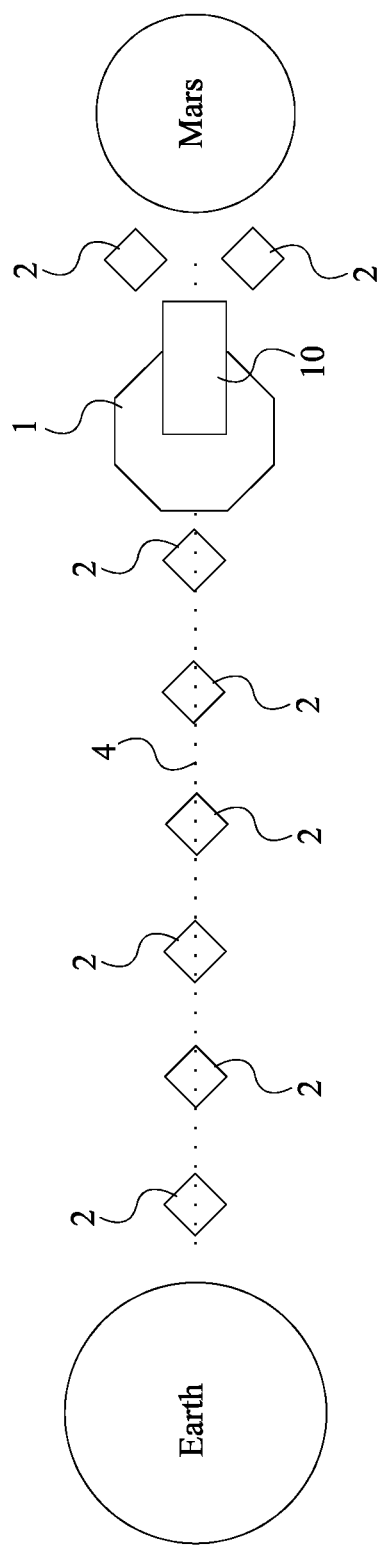
FIG. 7 is a diagram thereof, depicting the kinetic launcher being repositioned to direct a final set of the plurality of subsidiary spacecraft such that the primary spacecraft is accelerated in the direction necessary to achieve LMO.

In a second exemplary embodiment, the primary spacecraft 1 travels from Earth to Mars. In reference to FIG. 5, the plurality of subsidiary spacecraft 2 is separated into a plurality of sets, wherein a first set is loaded onto the primary spacecraft 1, while the remaining sets are pre-positioned along the flight path 4. In reference to FIG. 6, the primary spacecraft 1 launches the first set in order to travel to a second set, wherein the second set is loaded and launched in order to travel to a third set, and so on; each of the plurality of subsidiary spacecraft 2 being discharged from the kinetic launcher 10 one at a time. Upon reaching LMO, the kinetic launcher 10 is redirected, as depicted in FIG. 7, in order to accelerate the primary spacecraft 1 in the correct direction to settle into LMO.

Figure 8:
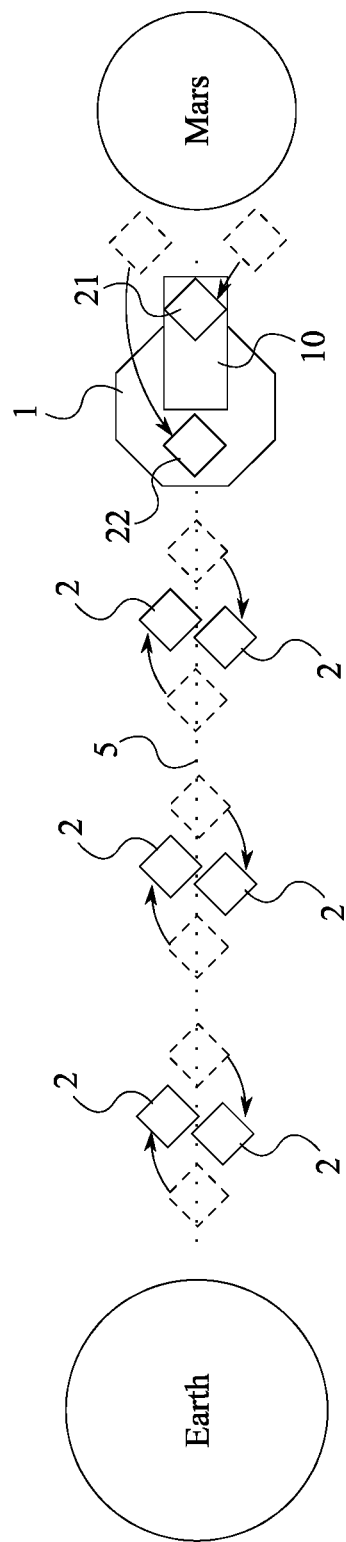
FIG. 8 is a diagram thereof, depicting the navigation of the plurality of subsidiary spacecraft to a position along the subsequent flight path, wherein the plurality of subsidiary spacecraft is distributed in sets.

In reference to FIG. 8, after being discharged from the kinetic launcher 10, each of the plurality of subsidiary spacecraft 2 navigates to a position along the subsequent flight path 5; the subsequent flight path 5 being a return path from Mars to Earth. The primary spacecraft 1 waits in LMO, while a first set of subsidiary spacecraft from the plurality of subsidiary spacecraft 2 navigates back to the primary spacecraft 1. The first set of subsidiary spacecraft is then loaded onto the primary spacecraft 1 and discharged from the kinetic launcher 10 in order to propel the primary spacecraft 1 to a second set of subsidiary spacecraft from the plurality of subsidiary spacecraft 2. The second set of subsidiary spacecraft is then used to propel the primary spacecraft 1 to a third set of subsidiary spacecraft from the plurality of subsidiary spacecraft 2, and so on until the primary spacecraft 1 returns to Earth.

Figure 10:
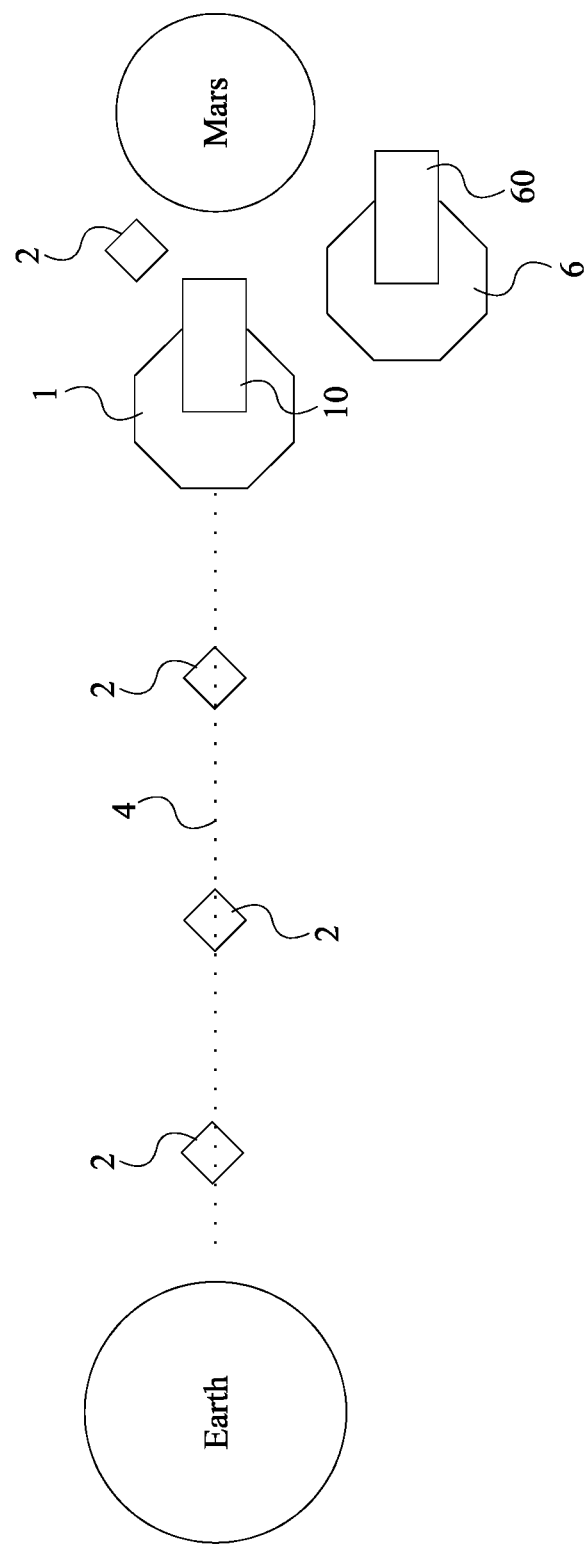
FIG. 10 is a diagram thereof, depicting the navigation of the primary spacecraft along the flight path by sequentially loading and discharging each of the plurality of subsidiary spacecraft one at a time.

In reference to FIG. 9, in a third exemplary embodiment, the primary spacecraft 1 travels from Earth to Mars, while the subsequent spacecraft 6 is already in LMO. Each of the plurality of subsidiary spacecraft 2 is pre-positioned along the flight path 4, except for one of the plurality of subsidiary spacecraft 2 that is loaded onto the primary spacecraft 1. In reference to FIG. 10, each of the plurality of subsidiary spacecraft 2 is discharged from the kinetic launcher 10 one at a time in order to propel the primary spacecraft 2 along the flight path 4. Upon reaching LMO, the kinetic launcher 10 is redirected in order to accelerate the primary spacecraft 1 in the correct direction to settle into LMO.

Figure 11:
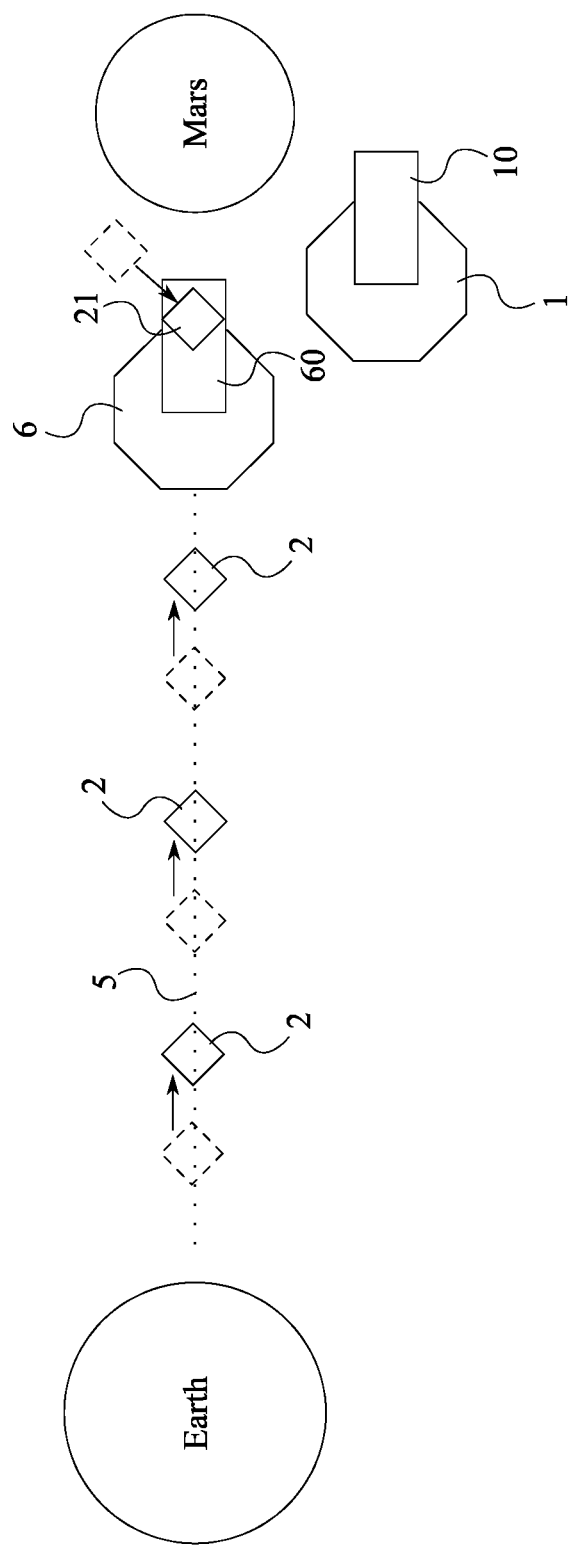
FIG. 11 is a diagram thereof, depicting the navigation of the plurality of subsidiary spacecraft to a position along the subsequent flight path, wherein the subsequent spacecraft is in position to travel along the subsequent flight path.

In reference to FIG. 11, after being discharged from the kinetic launcher 10, each of the plurality of subsidiary spacecraft 2 navigates to a position along the subsequent flight path 5; the subsequent flight path 5 being a return path of the subsequent spacecraft 6. After the primary spacecraft 1 has arrived at Mars, a first subsidiary spacecraft from the plurality of subsidiary spacecraft 2 navigates to the subsequent spacecraft 6. The first subsidiary spacecraft is then loaded onto the subsequent spacecraft 6 and discharged from the subsequent kinetic launcher 60 in order to propel the subsequent spacecraft 6 to a second subsidiary spacecraft from the plurality of subsidiary spacecraft 2. The second subsidiary spacecraft is then used to propel the subsequent spacecraft 6 to a third subsidiary spacecraft from the plurality of subsidiary spacecraft 2, and so on until the subsequent spacecraft 6 returns to Earth.

Figure 12:
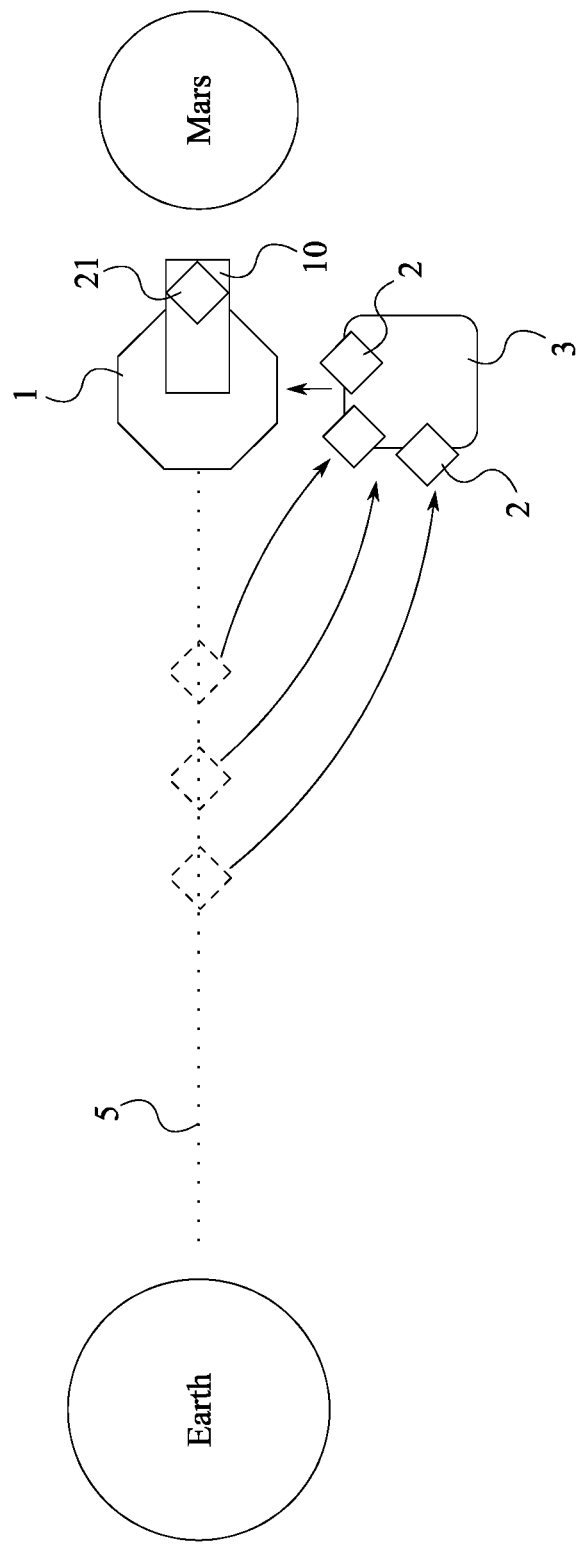
FIG. 12 is a diagram depicting the use of a reloading station to transfer one or more of the plurality of subsidiary spacecraft onto the primary spacecraft.
Figure 15:
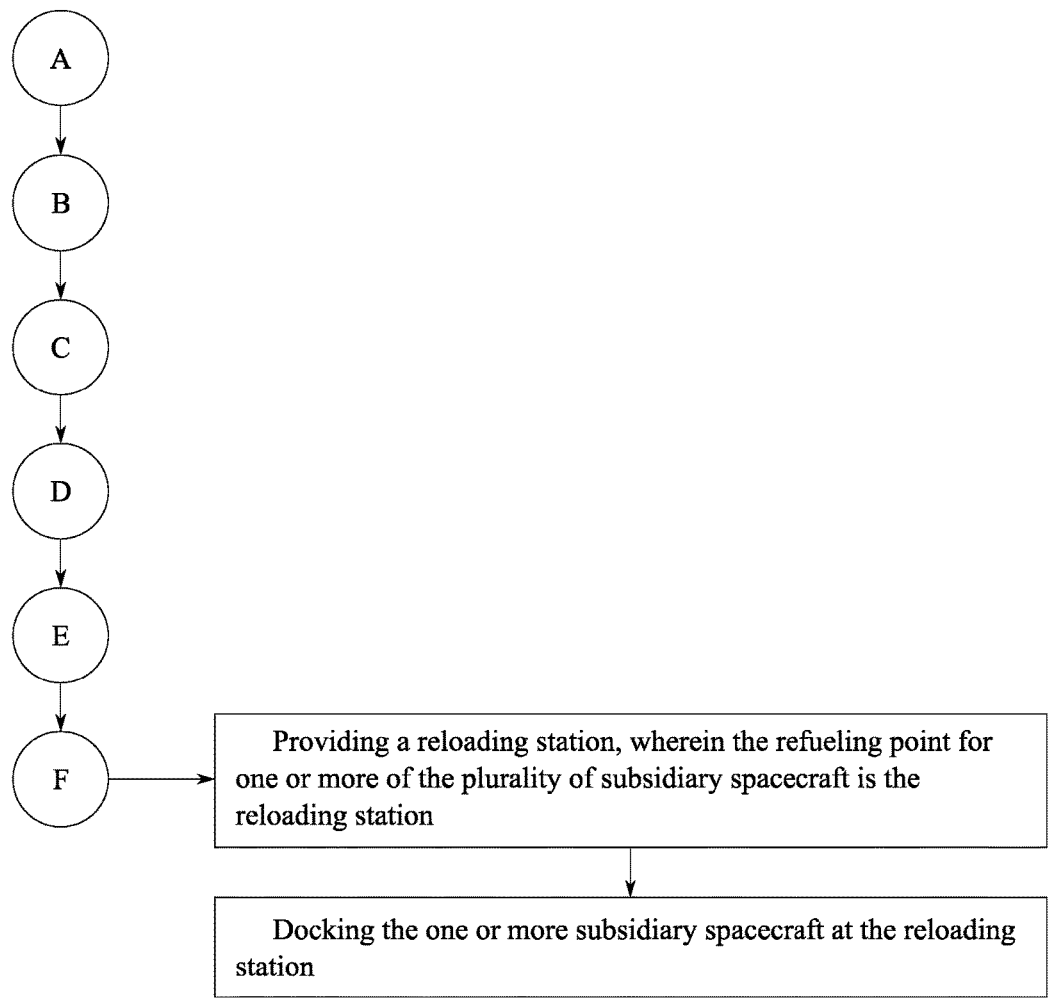
FIG. 15 is a flowchart thereof, further reciting the steps for utilizing a reloading station.

In reference to FIG. 12 and FIG. 15, in some embodiments of the present invention, a reloading station 3 may be utilized to transfer the plurality of subsidiary spacecraft 2 onto the primary spacecraft 1. In such a scenario, the reloading station 3 serves as the refueling point for one or more of the plurality of subsidiary spacecraft 2. The one or more subsidiary spacecraft is docked at the reloading station 3, ensuring the one or more subsidiary spacecraft remain together. The use of the reloading station 3 may also allow the one or more subsidiary spacecraft 21 to temporarily be powered down, as the reloading station 3 maintains the positioning of the one or more subsidiary spacecraft.

Figure 14:
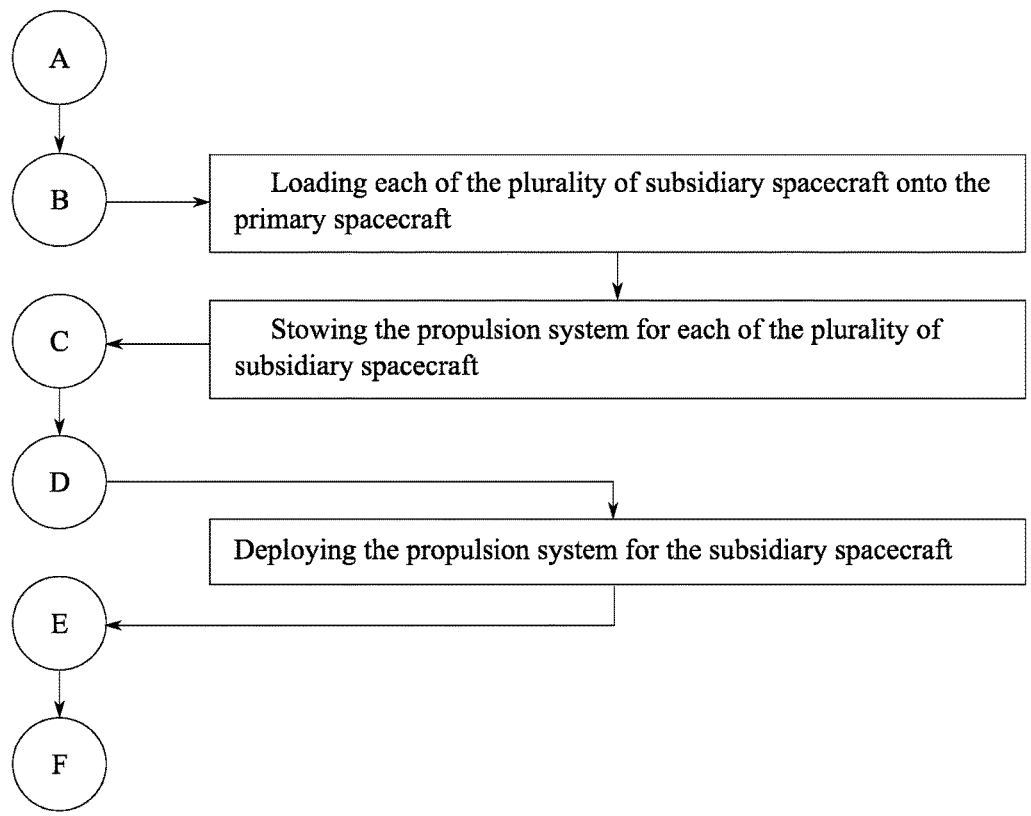
FIG. 14 is a flowchart thereof, further reciting the steps for handling the propulsion system of each of the plurality of subsidiary spacecraft.

In reference to FIG. 14, depending on the propulsion system 20 that is used for each of the plurality of subsidiary spacecraft 2, steps for stowing and deploying the propulsion system 20 may be required. For example, if the propulsion system 20 for each of the plurality of subsidiary spacecraft 2 is a solar sail, then the propulsion system 20 for each of the plurality of subsidiary spacecraft 2 must be stowed prior to the plurality of subsidiary spacecraft 2 being loaded onto the primary spacecraft 1 or into the kinetic launcher 10. Once discharged from the kinetic launcher 10, the propulsion system 20 for each of the plurality of subsidiary spacecraft 2 is then deployed, allowing the plurality of subsidiary spacecraft 2 to navigate to the refueling point. Stowing of the propulsion system 20 protects the propulsion system 20 and makes it easier to load and launch the plurality of subsidiary spacecraft 2.

A primary benefit of the present invention is that little to no new Earth sourced mass is required for each transit. If the propulsion system 20 for each of the plurality of subsidiary spacecraft 2 does not vent reaction mass, then no mass is lost and no additional mass is needed, allowing for the continuous operation of the primary spacecraft 1 and the plurality of subsidiary spacecraft 2. If the propulsion system 20 for each of the plurality of subsidiary spacecraft 2 does vent reaction mass, then some additional mass is required; however, multiple trips are still possible without the need for the new Earth sourced mass being added.

Another benefit of the present invention is that the method scales more favorably to faster and faster transits as compared to travel using rocket fuel, thus allowing less and less radiation to human passengers. The scalability of the present invention is due to the ability to cut down the journey into many small segments. While rocket fuel must be carried for the entire journey, using the present invention, the primary spacecraft 1 only needs to carry fuel (the plurality of subsidiary spacecraft 2) for short segments. With the plurality of subsidiary spacecraft 2 pre-positioned along the flight path 4, the primary spacecraft 1 can travel many small segments, while carrying little to no reaction mass.

When using rocket fuel, or other forms of non-reusable ejecting reaction mass, the rocket fuel must be carried for the entire journey. Resultantly, a large fraction of momentum is wasted on accelerating the remaining rocket fuel, which will only be ejected later. Using the present invention, nearly all of the reaction mass of ejecting the plurality of subsidiary spacecraft 2 during each segment is converted into momentum of the primary spacecraft 1, as the primary spacecraft 1 does not need to carry each of the plurality of subsidiary spacecraft 2 simultaneously.

Although the invention has been explained in relation to its preferred embodiment, it is to be understood that many other possible modifications and variations can be made without departing from the spirit and scope of the invention as hereinafter claimed.

What is claimed is:

1. A method of space travel using a high acceleration thrust vehicle in combination with a plurality of low acceleration thrust vehicles, the method comprises the steps of:
   A. providing a primary spacecraft, wherein the primary spacecraft comprises a kinetic launcher;
   B. providing a plurality of subsidiary spacecraft, wherein each of the plurality of subsidiary spacecraft comprises a propulsion system;
   C. loading one of the plurality of subsidiary spacecraft into the kinetic launcher;
   D. discharging the subsidiary spacecraft from the kinetic launcher in order to navigate the primary spacecraft about a flight path, wherein the subsidiary spacecraft is launched in a first direction in order to propel the primary spacecraft in a second direction, opposite to the first direction;

E. navigating the subsidiary spacecraft to a refueling point using the propulsion system of the subsidiary spacecraft; and F. repeating steps C-E for a plurality of remaining spacecraft from the plurality of subsidiary spacecraft.

2. The method of space travel using a high acceleration thrust vehicle in combination with a plurality of low acceleration thrust vehicles, the method as claimed in claim 1 further comprises the step of:

loading each of the plurality of subsidiary spacecraft onto the primary spacecraft.

3. The method of space travel using a high acceleration thrust vehicle in combination with a plurality of low acceleration thrust vehicles, the method as claimed in claim 2, wherein each of the plurality of subsidiary spacecraft is transferred from a reloading station to the primary spacecraft.

4. The method of space travel using a high acceleration thrust vehicle in combination with a plurality of low acceleration thrust vehicles, the method as claimed in claim 1 further comprises the step of:

stowing the propulsion system for each of the plurality of subsidiary spacecraft.

5. The method of space travel using a high acceleration thrust vehicle in combination with a plurality of low acceleration thrust vehicles, the method as claimed in claim 1 further comprises the step of:

deploying the propulsion system for the subsidiary spacecraft.

6. The method of space travel using a high acceleration thrust vehicle in combination with a plurality of low acceleration thrust vehicles, the method as claimed in claim 1, wherein the refueling point for each of the plurality of subsidiary spacecraft is plotted along a subsequent flight path.

7. The method of space travel using a high acceleration thrust vehicle in combination with a plurality of low acceleration thrust vehicles, the method as claimed in claim 6, wherein the subsequent flight path is plotted for the primary spacecraft.

8. The method of space travel using a high acceleration thrust vehicle in combination with a plurality of low acceleration thrust vehicles, the method as claimed in claim 6, wherein the subsequent flight path is plotted for a subsequent spacecraft.

9. The method of space travel using a high acceleration thrust vehicle in combination with a plurality of low acceleration thrust vehicles, the method as claimed in claim 1 further comprises the steps of:

providing a reloading station, wherein the refueling point for one or more of the plurality of subsidiary spacecraft is the reloading station; and docking the one or more subsidiary spacecraft at the reloading station.

10. The method of space travel using a high acceleration thrust vehicle in combination with a plurality of low acceleration thrust vehicles, the method as claimed in claim 1, wherein the kinetic launcher is one of a coil-gun, a railgun, a magnetic levitation device, a linear motor, a catapult, or a circular acceleration device.

11. The method of space travel using a high acceleration thrust vehicle in combination with a plurality of low acceleration thrust vehicles, the method as claimed in claim 1, wherein the propulsion system of each of the plurality of subsidiary spacecraft produces high specific impulse thrust.

12. The method of space travel using a high acceleration thrust vehicle in combination with a plurality of low acceleration thrust vehicles, the method as claimed in claim 1, wherein the propulsion system for each of the plurality of subsidiary spacecraft is one of a solar sail, an electronics sail, a magnetic sail, an ion propulsion system, or a magnetic thrust device.

* * * * *